Sept. 26, 1944.    R. J. STODDARD    2,359,258
TRUCK
Filed Dec. 17, 1941    3 Sheets-Sheet 1
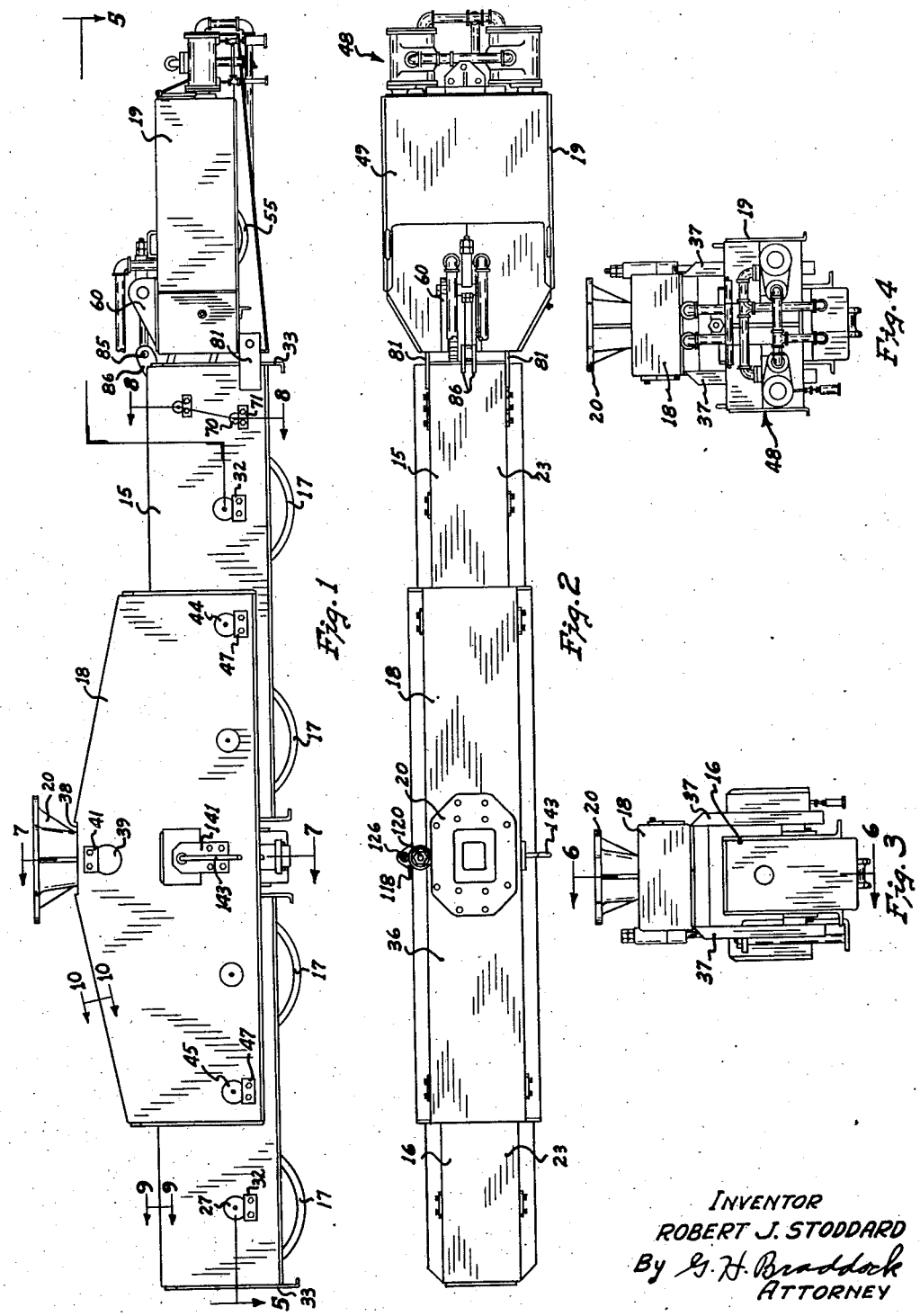
INVENTOR
ROBERT J. STODDARD
By G. H. Braddock
ATTORNEY Sept. 26, 1944.  R. J. STODDARD  2,359,258
TRUCK
Filed Dec. 17, 1941  3 Sheets-Sheet 2
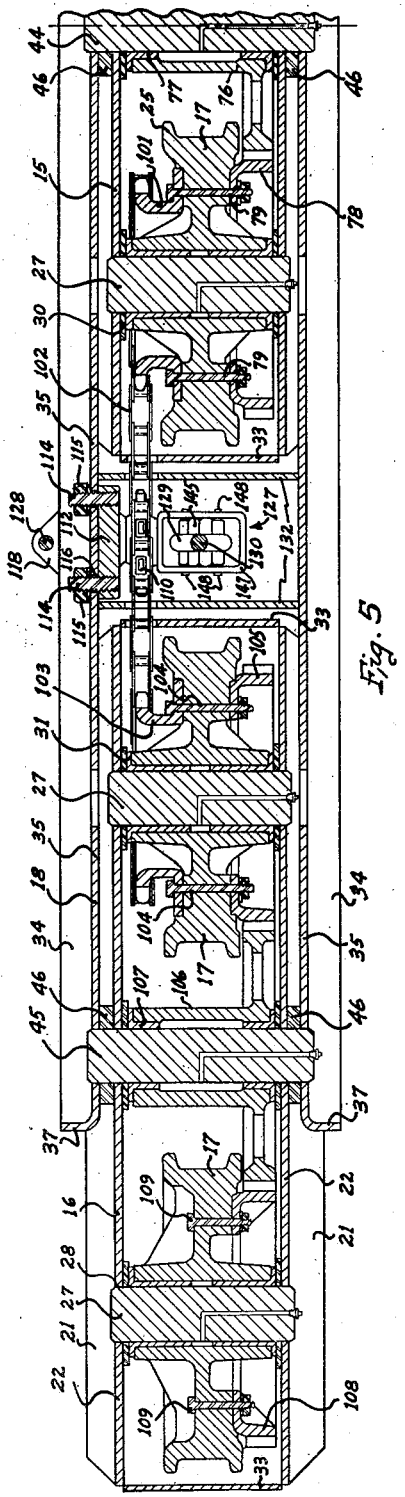
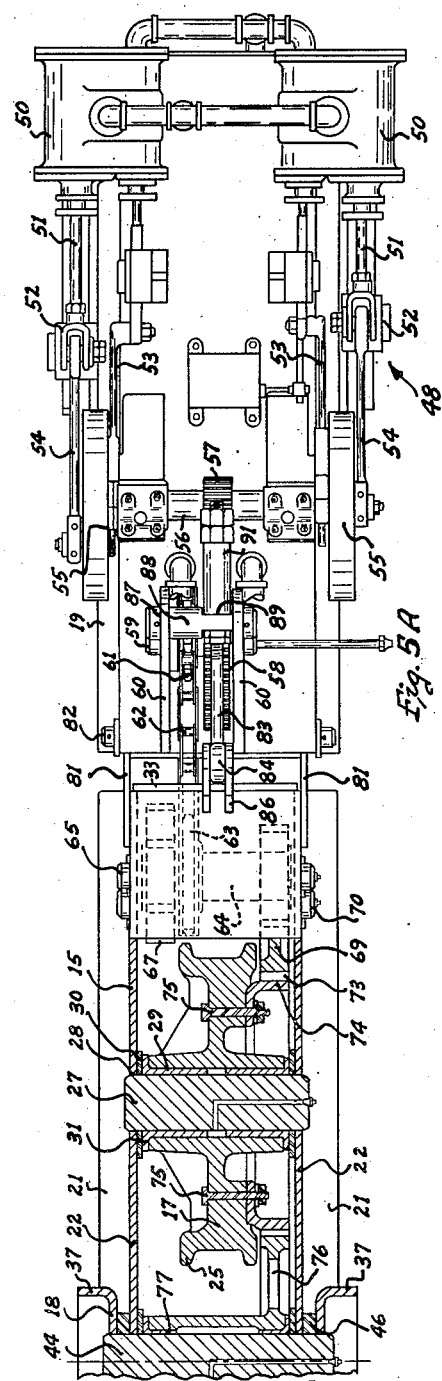
INVENTOR
ROBERT J. STODDARD
By G. H. Braddock
ATTORNEY Sept. 26, 1944.  R. J. STODDARD  2,359,258
TRUCK
Filed Dec. 17, 1941  3 Sheets-Sheet 3
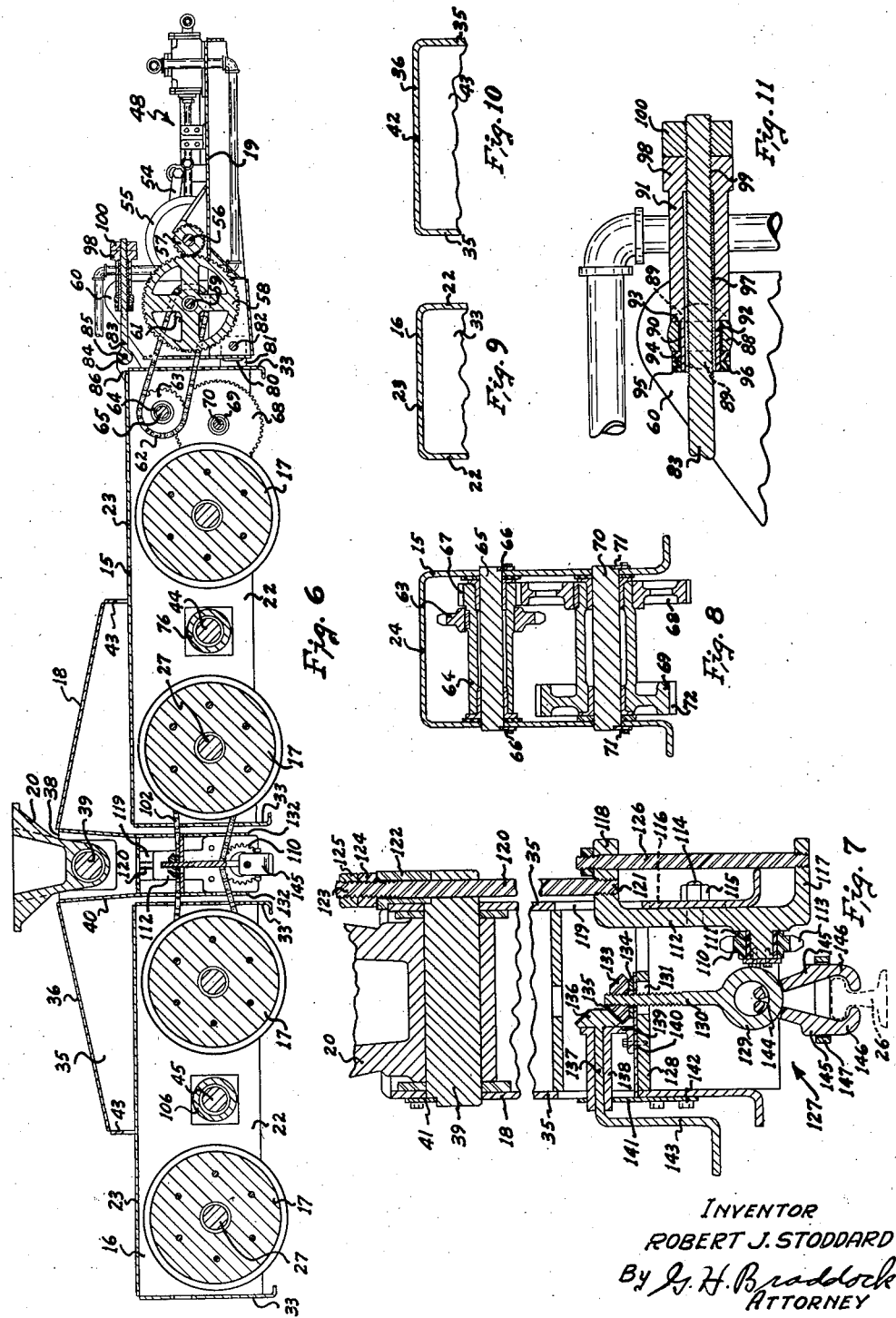
INVENTOR
ROBERT J. STODDARD
By J. H. Braddock
ATTORNEY Patented Sept. 26, 1944

2,359,258

UNITED STATES PATENT OFFICE 2,359,258

TRUCK

Robert J. Stoddard, St. Paul, Minn., assignor to American Hoist & Derrick Company, St. Paul, Minn., a corporation of Delaware Application December 17, 1941, Serial No. 423,340

16 Claims. (Cl. 105—179)

This invention has relation to a truck, and has more especial relation to a crane truck, so-called.

An object of the invention is to provide a truck which will be of novel and improved construction.

A further object is to provide a so-called crane truck wherein will be incorporated various improved features and characteristics of construction which will be novel both as individual entities of the truck and in combination with each other.

A further object is to provide a truck which will include as parts thereof a plurality of telescoping entities or frames assembled together in novel and improved manner.

A further object is to provide a truck which will include spaced apart truck frames, one of which may desirably support a truck engine frame, and an equalizing girder frame between and assembled with said spaced apart truck frames in novel and improved manner.

A further object is to provide a truck which will include spaced apart truck frames and an equalizing girder frame between and telescopically and pivotally assembled with said truck frames.

A further object is to provide a crane truck which will include an equalizing girder frame adapted to support a usual truck center plate, and a plurality of spaced apart truck frames at either end of said equalizing girder frame telescopically and pivotally associated with the equalizing girder frame in novel and improved manner and so that each of said truck frames can have oscillatory movement in a vertical plane relative to said equalizing girder frame, and vice versa.

A further object is to provide a truck of the present character which will include wheels to be driven, and a novel and improved construction and arrangement for driving said wheels.

A further object is to provide a truck which will include spaced apart truck frames, an equalizing girder frame between and assembled with said spaced apart truck frames in such manner that there can be relative pivotal movement between the equalizing girder frame and each of the truck frames, wheels upon said truck frames adapted to be driven, and a novel and improved mechanism for driving said wheels.

A further object is to provide a so-called crane truck which will include an equalizing girder frame adapted to support a usual truck center plate, a plurality of spaced apart truck frames at either end of the equalizing girder frame telescopically and pivotally assembled with the equalizing girder frame so that there can be relative pivotal movement in a vertical plane between said equalizing girder frame and each of said truck frames, a wheel upon each truck frame adapted to be driven, and a mechanism of unique type for driving said wheels.

A further object is to provide in the truck a new and improved construction and arrangement for accomplishing adjustment of the truck wheel drive mechanism.

A further object is to provide in the truck a new and improved construction and arrangement, including a track clamp, selectively for fastening the truck in stationary position relatively to or upon a riding rail for said truck and for releasing the truck from said riding rail for movement therealong.

And a further object is to provide a truck of structure as illustrated in the drawings and hereinafter explicitly set forth.

With the above objects in view, as well as others which will appear as the specification proceeds, the invention comprises the construction, arrangement and combination of parts as now to be fully described and as hereinafter to be explicitly claimed, it being understood that the disclosure herein is merely illustrative and intended in no way in a limiting sense, changes in details of construction and arrangement of parts being permissible so long as within the spirit of the invention and the scope of the claims which follow.

In the accompanying drawings forming a part of this specification,

Fig. 1 is a side elevational view of a truck including the features and characteristics of the invention;

Fig. 2 is a top plan view of the truck of Fig. 1;

Fig. 3 is an end elevational view of the truck as seen from the left in Figs. 1 and 2;

Fig. 4 is an end elevational view of the truck as seen from the right in Figs. 1 and 2;

Figs. 5 and 5A, together, are an enlarged horizontal longitudinal sectional view of the truck, partially in top plan, taken substantially on line 5—5 in Fig. 1, the engine guard being removed;

Fig. 6 is a vertical longitudinal sectional view of the truck, taken substantially on line 6—6 in Fig. 3, the engine guard being omitted;

Fig. 7 is an enlarged vertical transverse sectional view, taken substantially on line 7—7 in Fig. 1;

Fig. 8 is a detail sectional view, taken substantially on line 8—8 in Fig. 1;

Fig. 9 is a detail sectional view, taken substantially on line 9—9 in Fig. 1;

Fig. 10 is a detail sectional view, taken substantially on line 10—10 in Fig. 1; and Fig. 11 is an enlarged fragmentary sectional view, corresponding with the disclosure of Fig. 6, detailing features of an engine frame supporting and chain adjusting or tensioning mechanism of the truck.

With respect to the drawings and the numerals of reference thereon, the truck includes a pair of spaced apart truck frames, denoted 15 and 16, respectively, each supported by wheels, represented 17. As shown, each truck frame 15, 16 is supported by a pair of wheels 17 arranged in tandem. An equalizing girder frame of the truck, between the truck frames 15 and 16, is designated 18. A truck engine frame 19 is supported by the truck frame 15. The truck here disclosed is adapted for use as a crane truck, for supporting one corner of a structure (not shown), and to this end a usual truck center plate 20, carried by the equalizing girder frame 18, is included.

Each truck frame 15, 16 consists of an inverted, elongated U-member having outwardly extending flanges 21, 21 upon the lower margins of its spaced apart legs or side walls 22, 22, opposite its base or upper wall 23. As disclosed the U-member truck frame 15 is constituted as two Z-members welded at the longitudinal line 24 to provide said truck frame 15 with flanges, whereas the U-member truck frame 16 is constituted as a single, or unwelded, piece of metal providing said truck frame 16 with flanges. Both truck frames could be constructed after the fashion of either the truck frame 15 or the truck frame 16, or in some other suitable and convenient manner. As disclosed, the U-members of the truck frames 15 and 16 are of equal width. Said truck frames 15 and 16 could be duplicates, but desirably the truck frame 15 may be longer than the truck frame 16.

Each wheel 17 is flanged, as at 25, to be snugly ridable on a rail 26, shown in Fig. 7, and an axle 27 for each wheel is suitably and conveniently mounted, as at 28, in the oppositely disposed side walls 22, 22 of the U-member constituting the corresponding truck frame, 15 or 16 as the case may be, for the wheel. The axles 27 are, in the instance of each truck frame, spaced apart a distance to cause the wheels 17 carried by said axles to be in desired and predetermined spaced relation to each other. Said wheels 17 span substantially the distance between said side walls 22, 22, bushings 29 are disposed upon the axles 27 within the hubs of the wheels, and reinforcing pads 30 upon said axles, together with flanges 31 upon said bushings 29, lie snugly between the wheel hubs and the side walls 22, 22. The axles 27 are made stationary in their bearings by employment of key bars 32.

Each of the truck frames 15 and 16 may be reinforced in any suitable and convenient fashion. As shown, the truck frames include opposite end walls, each denoted 33, which are perpendicular to and meet the opposite ends of the side and upper walls 22, 22 and 23.

The equalizing girder frame 18 consists of an inverted, elongated member of substantially U-shape having outwardly extending flanges 34, 34 upon the lower margins of its spaced apart legs or side walls 35, 35, opposite its base or upper wall 36, and also having outwardly extending flanges 37, 37 upon each of the opposite ends of its spaced apart legs or side walls. The base or upper wall 36 of said equalizing girder frame 18 slants upwardly from its ends toward its midportion, and at its midportion said base or upper wall 36 is provided with an opening 38 which freely receives the lower portion of the truck center plate 20. A cross pin 39 disposed in the spaced apart legs or side walls 35, 35 of the equalizing girder frame 18 pivotally supports said truck center frame 20 for swinging movement in a vertical plane extending longitudinally of said equalizing girder frame, and of the truck. The front and rear walls of the opening 38, together with a vertical reinforcement structure 40 of the equalizing girder frame below said opening 38, limit the extent to which the truck center plate 20 can oscillate or rock, forwardly and rearwardly, upon said equalizing girder frame. The cross pin 39 is made stationary in its bearings by employment of key bars 41. As disclosed, the equalizing girder frame 18 is constituted as two members of substantially Z-shape welded at the longitudinal line 42 to provide said equalizing girder frame, but the equalizing girder frame could be constituted as a single, or unwelded, piece of metal. Or said equalizing girder frame could be fashioned in some other suitable and convenient manner. Reinforcing cross bars 43, 43 are at the ends of the equalizing girder frame 18 adjacent the base or upper wall 36.

The legs or side walls 35, 35 of the equalizing girder frame are spaced farther apart than are the legs or side walls 22, 22 of each of the truck frames 15 and 16, and said truck frames 15 and 16 are separately telescopically and pivotally associated with the equalizing girder frame in such manner that the truck frames lie at opposite sides of and in slightly spaced, adjacent relation to the reinforcement structure 40. That is, the opposite end portions of the equalizing girder frame 18 overlie the adjacent end portions of the truck frames 15 and 16, respectively, in such manner that the side walls 22, 22 of each truck frame are between the side walls 35, 35 of said equalizing girder frame, and pivot pins, designated 44 and 45, secure the frames 15, 18 and 18, 16, respectively, to each other. The construction and arrangement are such that when the truck frames 15 and 16 are assembled with the equalizing girder frame 18 the lower edges of the reinforcing cross bars 43, 43 are in spaced relation to the bases or upper walls 23, 23 of said truck frames 15 and 16, about as disclosed in Fig. 6, to offer no interference to relative swinging movement of the truck frames and said equalizing girder frame, and the construction and arrangement are also desirably such that when said truck frames and the equalizing girder frame are assembled, the lower edges of the spaced apart side walls 35, 35 of said equalizing girder frame are disposed at elevation slightly above the lower edges of the spaced apart side walls 22, 22 of the truck frames, about as disclosed in Figs. 1, 3 and 4. Preferably, the lower edges of all of the side walls 22, 22, 22, 22, 35, 35 may be substantially horizontal when the truck frames 15 and 16 and the equalizing girder frame 18 are assembled together. The wheels 17 are all of the same size and desirably project downwardly to position below the lower edges of the side walls 22, 22. More explicitly, each pivot pin 44, 45 is suitably and conveniently mounted in all of the alining side walls at the location of the pivot pin, as will be very clear from Figs. 5 and 5A. Spacing washers 46 upon the pivot pins 44 and 45 and between the four different sets of adjacent side walls 22, 35 situate the truck frames at the transverse center of the equalizing girder frame, and said pivot pins 44 and 45 are made stationary in their bearings by key bars 47. The pivot pins 44 and 45 are situated adjacent the opposite ends, respectively, of the equalizing girder frame 18 at the elevation of and in alinement with the axles 27, and, in the instance of each of the truck frames 15 and 16, there is a pivot pin, 44 or 45, as the case may be, midway between the wheels 17. See Figs. 1, 5, 5A and 6.

The truck engine frame 19 is disposed adjacent the end of the truck frame 15 which is opposite the equalizing girder frame 18, and suitably and conveniently supports a steam engine, represented generally at 48. A guard for the steam engine is designated 49. Said steam engine may be of ordinary or preferred construction. Speaking generally, it includes cylinders with heads 50, pistons with rods 51, cross heads and guides 52, valve motions 53, connecting rods 54 and crank shafts 55.

The crank shafts 55, adapted to be driven by said steam engine 48, are fixed upon a driving shaft 56 for accomplishing propulsion of the truck, and said driving shaft 56 fixedly carries a pinion 57 which meshes with a gear 58 fixed upon a horizontal cross shaft 59 carried by spaced apart uprights 60, 60 upon the truck engine frame 19. Said horizontal cross shaft 59 fixedly carries a sprocket 61, and a sprocket chain 62 rides said sprocket 61. The sprocket chain 62 also rides a sprocket 63 fixed upon a spur pinion 64 suitably and conveniently rotatably mounted upon a cross pin 65 having its opposite ends fixed, as by key bars 66, in the side walls 22, 22 of the truck frame 15. The teeth 67 of the spur gear 64 mesh with the teeth of a spur gear 68 fixed upon a spur gear 69, and said spur gear 69 is suitably and conveniently rotatably mounted upon a cross pin 70 having its opposite ends fixed, as at 71, in said side walls 22 of said truck frame 15. The teeth 72 of said spur gear 69 are in mesh with the teeth 73 of a spur gear 74 fixed, as at 75, to the wheel 17 of the truck frame 15 which is next adjacent the truck engine frame 19. The spur gear 74 is in surrounding relation to the hub of the wheel 17 by which said spur gear 74 is carried. An idler gear 76 rotatably mounted, as at 77, upon the pivot pin 44 is in mesh with the spur gear 74 and with a spur gear 78 fixed, as at 79, to the wheel 17 of the truck frame 15 which is opposite or spaced from said truck engine frame 19. The spur gear 78 is in surrounding relation to the hub of the corresponding wheel 17. Clearly, the wheels 17 of the truck frame 15 are adapted to be driven by the steam engine 48 through the instrumentality of the crank shafts 55, the driving shaft 56, the pinion 57, the gear 58, the horizontal cross shaft 59, the sprocket 61, the chain 62, the sprocket 63, the spur pinion 64, the spur gear 68, the spur gear 69, the spur gear 74, the idler gear 76 and the spur gear 78.

Mechanism is included for adjustably mounting or supporting the truck engine frame 19 upon the truck frame 15 so that the tension of the sprocket chain 62 can be readily and easily and nicely adjusted to the purpose that the drive means for the truck will be caused to function smoothly and evenly. More explicitly, said trunk engine frame 19 includes spaced apart, oppositely disposed ears 80, 80 at opposite sides thereof situated at the lower, inside or rearward corner of the truck engine frame, the truck frame 15 includes ears 81, 81, including an ear 81 positioned in adjacent relation to each ear 80, and a pivot pin 82, located in all of the ears 80, 81, 80, 81 and extending across said truck engine frame, constitutes means for pivotally attaching the truck engine frame 19 to said truck frame 15. The construction and arrangement are such that said truck engine frame overhangs from the truck frame 15, and said mechanism for adjustably mounting or supporting the truck engine frame includes devices for maintaining said truck engine frame in substantial horizontal alinement with said truck frame 15, as well as for causing said sprocket chain 62 to be properly tensioned.

An adjusting screw 83, disposed longitudinally of the truck, has an eye 84 upon one end thereof pivotally supported upon a cross pin 85 situated in spaced ears 86 disposed at the transverse center of the forward or adjacent end of the base or upper wall 23 of the truck frame 15. The construction and arrangement are such that the adjusting screw 83 is mounted upon the cross pin 85 between the spaced ears 86 for pivotal or swinging movement in a vertical plane, but is fixed against the possibility of turning movement. The spaced uprights 60, 60, which support the horizontal cross shaft 59, fixedly support, as at 87, an anchor bar 88 which is situated above and in spaced, parallel relation to said horizontal cross shaft 59, at about the elevation of and perpendicular to the adjusting screw 83. Said anchor bar 88 has portions of its opposite sides cut away, as at 89, and the anchor bar is provided with a transverse cylindrical opening 90 which extends from one of the cutaway portions 89 to the other. An adjusting nut 91 includes a cylindrical reduced end portion 92 thereof situated within and passing snugly through the transverse cylindrical opening 90 in such manner as to cause the cylindrical adjusting nut to be longitudinally alined with the adjusting screw 83. An annular shoulder 93 of said adjusting nut 91, in surrounding relation to the reduced end portion 92, is adapted to lie against the adjacent surface of the anchor bar 88 surrounding the cylindrical opening 90, and a nut 94 turned down upon an external thread 95 upon the free end of the reduced portion 92 against the surface of said anchor bar opposite the annular shoulder 93 is for the purpose of retaining said reduced portion 92 within said cylindrical opening 90 and said annular shoulder 93 in engagement with the anchor bar. A lock nut 96 upon the external thread 95 is for insuring the fixed position of the nut 94. The construction and arrangement are such that the adjusting nut 91 is freely rotatable within the cylindrical opening 90, and is, at the same time, fixed against movement transversely of the anchor bar 88. As will be more clear from Figs. 6 and 11, the body of the cylindrical adjusting nut 91 is hollow, as denoted at 97, to freely receive the adjusting screw 83, and the head 98 of said adjusting nut includes an internal thread 99 with which the external thread upon said adjusting screw is engaged. The adjusting screw 83 passes through the whole of the length of the adjusting nut 91 and projects to position beyond the head 98 of said adjusting nut. A lock nut 100 upon the free end portion of said adjusting screw 83 and against the head of said adjusting nut 91 is for insuring the set position of the adjusting nut.

It will be evident that by turning movement of the adjusting nut 91 this will be caused to be moved inwardly or outwardly, as the case may be, of the adjusting screw 83, with consequent swinging adjustment in corresponding direction of the truck engine frame 19 about the pivot pin 82 as an axis. Evidently, the overhanging weight of said truck engine frame is supported, through the instrumentality of the anchor bar 88, by the adjusting nut 91, which adjusting nut is in turn supported by the adjusting screw 83, itself supported by the truck frame 15. Plainly, the tension of the sprocket chain 62 will be a function of the adjusted position of the truck engine frame 19. With upward swinging adjustment of said truck engine frame, the sprocket 61 will be moved closer to the sprocket 63, and vice versa. Thus, the mechanism for adjustably mounting or supporting the truck engine frame upon the truck frame 15 obviously includes devices for causing the tension of the sprocket chain 62 to be adjusted. In practice, the adjusting nut 91 will be set along the length of the adjusting screw 83 at position designed to cause said sprocket chain 62 to be under desired and predetermined tension.

The wheels 17 of the trunk frame 16 are driven from the wheel 17 of the truck frame 15 to which the spur gear 78 is secured. More explicitly, the bolts 79 which secure said spur gear 78 to one side of the wheel 17 of the truck frame 15 which is spaced from or opposite the truck engine frame 19 also secure a sprocket 101 to the opposite side of this mentioned wheel. A sprocket chain 102, which rides the sprocket 101 and passes freely through openings in adjacent end walls of the truck frames 15 and 16 and in the reinforcement structure 40 of the equalizing girder frame 18, also rides a sprocket 103 which is fixed, as at 104, to the wheel 17 of the truck frame 16 which is next adjacent the truck frame 15. A spur gear 105 is secured by the bolts 104 against the surface of this same mentioned wheel 17 opposite the sprocket 103. An idler gear 106 rotatably mounted, as at 107, upon the pivot pin 45 is in mesh with the spur gear 105 and with a spur gear 108 fixed, as at 109, to the wheel 17 of the truck frame 16 which is opposite or spaced from the truck frame 15. Clearly, the wheels 17 of the truck frame 16 are adapted to be driven from the spur gear 78 through the instrumentality of the wheel 17 having said spur gear 78, the sprocket 101, the sprocket chain 102, the sprocket 103, the spur gear 105, the idler gear 106 and the spur gear 108. Accomplishment of the drive of the wheels 17 of the truck frame 16 from a wheel 17 of the truck frame 15 through the instrumentality of the sprocket chain 102 evidently makes provision whereby there can be relative swinging movement between the equalizing girder frame 18 and said truck frames 15 and 16.

Devices of the truck for adjusting the tension of said sprocket chain 102 include an idler sprocket 110 rotatably mounted, as at 111, upon the base 112 of a U-bracket and having its teeth 113 engaged with the underside of the lower length of the sprocket chain 102, as will be more clear from Figs. 5, 6 and 7. The surface of said base 112 of the U-bracket opposite the idler sprocket 110 is held against the inner surface of the adjacent side wall 35 of the equalizing girder frame 18 by small screw members 114, with nuts 115 thereon, imbedded in the base of the U-bracket and slidably disposed in vertical slots 116 through said mentioned side wall 35. The construction and arrangement are such that the screw members 114 and nuts 115 retain said U-bracket in sliding relation to the inner surface of the side wall of the equalizing girder frame having the U-bracket. The legs 117 and 118 of said U-bracket extend outwardly. The lower leg 117 is disposed below and in spaced relation to the lower margin of the equalizing girder frame 18, while the upper leg 118 is slidable in a vertical slot 119 through the side wall 35 having the U-bracket disposed at elevation above the vertical slots 116. The U-bracket is adjustable vertically of the equalizing girder frame by means of a vertical take-up rod 120 which has its lower end threaded, as at 121, in the upper leg 118 of said U-bracket. The length of said take-up rod 120 is slidably disposed in an end portion of the cross pin 39, as well as in a spacer element 122 rested upon said cross pin, and the externally threaded upper end portion 123 of the take-up rod 120 extends upwardly beyond the spacer element 122. A nut 124 upon the externally threaded upper end portion 123 of said take-up rod 120 and engaged against the upper surface of said spacer element 122 is for the purpose of accomplishing vertical adjustment of the U-bracket, with the idler sprocket 110, and a lock nut 125 upon the thread 123 and against the nut 124 is for insuring the position of said nut 124. In practice the idler sprocket 110 will be set at elevation to insure proper tensioning of the sprocket chain 102 designed to permit requisite swinging movement of the frames 15, 18 and 16 relatively to each other. Numeral 126 represents a reinforcing element between the legs 117 and 118 of the U-bracket.

A track clamp, represented generally at 127, or a construction and arrangement selectively for fastening the truck in stationary position relative to or upon the rail 26 and for releasing the truck for movement along the rail, is best disclosed in Figs. 1, 2, 5, 6 and 7.

A horizontal platform 128, constituted as a part of the reinforcement structure 40, is situated directly below the truck center plate 20 in considerably spaced relation to said truck center plate and at elevation somewhat above the rail 26. A bolt of the track clamp 127 is constituted as an eye 129 and an externally threaded shank 130 integral with the eye. The externally threaded shank 130 is disposed vertically within and passes through an opening 131 in the horizontal platform 128 situated at the midwidth of the equalizing girder frame 18 in spaced relation to vertical walls 132, 132 of the reinforcement structure 40, and the eye 129 is at the lower end of said externally threaded shank 130 and at about the elevation of lower portions of the side walls 35, 35 of said equalizing girder frame. A bevel pinion 133, threadably engaged with the upper end portion of the externally threaded shank 130 and rested upon a washer 134 itself rested upon said horizontal platform 128 in surrounding relation to said externally threaded shank, is in mesh at 135 with a second bevel pinion 136 integral with a shaft 137 rotatably mounted in an elongated bearing 138 constituted as a part of a bracket 139 fixedly supported, as at 140, upon the horizontal platform 128. The elongated bearing 138 retains the second bevel pinion 136 engaged against the bevel pinion 133 in such manner as to retain said bevel pinion 133 down against the washer 134, and said bevel pinion 133 engages the second bevel pinion 136 to cause the shaft 137 and said second bevel pinion to be fixed against movement longitudinally of the elongated bearing 138. A support for the end portion of said elongated bearing 138 opposite or spaced from said second bevel pinion 136 is constituted as a strip of metal 141 secured at 142 to a side wall 35 of the equalizing girder frame 18. A crank 143 for accomplishing rotation of the second bevel pinion 136 is integral with the shaft 137 and is situated at an outer side of said equalizing girder frame, opposite the U-bracket and the idler sprocket 110 carried thereby as disclosed, to be readily accessible. The eye 129 supports, as at 144, oppositely disposed track clamp jaws 145, 145 for free swinging movement of the jaws from and toward each other. The track clamp jaws 145, 145 include lower hook portions, denoted 146, 146, which are complemental to each other and are adapted to be engaged about the opposite sides of the head of the rail 26. A track clamp link 147 is slidable upon the track clamp jaws 145, 145, and limit lugs 148, 148 upon said track clamp jaws preclude the possibility of accidental removal of the link 147 from the jaws.

In practice, the track clamp jaws 145, 145 are placed upon the head of the rail 26 in about the manner as disclosed in Fig. 7 when it is the intention to fasten the truck to said rail, and the crank 143 is rotated in direction to cause the eye bolt to be elevated, thus to cause the hook portions 146, 146 of said clamp jaws to be pulled or forced up tight against the opposite sides and lower surfaces of the rail head. When the track clamp is secured upon said rail 26, the link 147 rests upon the top of the rail, as in said Fig. 7, in snug surrounding relation to intermediate portions of the clamp jaws 145, 145 just above the hook portions 146, 146, thus to insure the positions of said clamp jaws upon said rail. When the truck is to be released from the rail, the track clamp link 147 is lifted from its position as in Fig. 7 to released condition of the track clamp jaws 145, 145, said clamp jaws are swung outwardly away from each other to be clear of the head of said rail, and the crank 143 is rotated in direction to cause the eye bolt to be lifted to position causing the jaws 145, 145, with the link 147, to be situated above the elevation of, and thus clear of, the rail 26. That is, when the truck is in transit, the track clamp is, in its entirety, positioned above the elevation of the traveling rail, about as disclosed in Figs. 1 and 6.

The pivot pins 44 and 45 separately connect the truck frames 15 and 16, respectively, to the equalizing girder frame 18, and, save for the connection between said truck frames 15 and 16 through the medium of said equalizing girder frame 18 and said pivot pins 44 and 45, the truck frames are independent of each other. Provision is included for equalizing action between the girder frame 18 and each of the truck frames 15 and 16, and, hence, provision is also included for equalizing action between said truck frames 15 and 16 themselves. The equalizing girder frame is telescoped with the truck frames, and said truck frames lie in adjacent relation to each other. Accomplishment of the drive of the wheels 17 upon the truck frame 16 from a wheel 17 upon the truck frame 15 through the medium of the sprocket chain 102 evidently will not cause interference with or hindrance of the equalizing action.

What is claimed is:

1. A truck comprising spaced apart truck frames each consisting of an upper wall and spaced apart, downwardly extending side walls substantially perpendicular to said upper wall, axles mounted in the side walls of each of said truck frames in spaced relation to each other, supporting wheels spaced longitudinally along the truck carried by said axles, an equalizing girder frame consisting of an upper wall and spaced apart, downwardly extending side walls substantially perpendicular to said upper wall disposed between said truck frames in telescoping relation thereto, and means mounted at spaced apart locations in the side walls of the equalizing girder frame and in the side walls of each truck frame at location intermediate and at the elevation of its axles pivotally supporting said equalizing girder frame upon said truck frames for swinging movement of the equalizing girder frame and the truck frames relatively to each other in vertical direction.

2. A truck comprising spaced apart truck frames each consisting of an upper wall and spaced apart, downwardly extending side walls substantially perpendicular to said upper wall, axles mounted in the side walls of each of said truck frames in spaced relation to each other, supporting wheels spaced longitudinally along the truck carried by said axles, an equalizing girder frame consisting of an upper wall and spaced apart, downwardly extending side walls substantially perpendicular to said upper wall disposed between said truck frames in telescoping relation thereto, means mounted at spaced apart locations in the side walls of the equalizing girder frame and in the side walls of each truck frame at location intermediate its axles pivotally supporting said equalizing girder frame upon said truck frames for swinging movement of the equalizing girder frame and the truck frames relatively to each other in vertical direction, a center plate, and means pivotally supporting said center plate upon the spaced apart side walls of said equalizing girder frame for swinging movement of the center plate in a vertical plane extending longitudinally of said truck.

3. A truck comprising spaced apart truck frames each consisting of an upper wall and spaced apart, downwardly extending side walls substantially perpendicular to said upper wall, axles mounted in the side walls of each of said truck frames in spaced relation to each other, supporting wheels spaced longitudinally along the truck carried by said axles, a supporting frame carried by one of said truck frames, an equalizing girder frame consisting of an upper wall and spaced apart, downwardly extending side walls substantially perpendicular to said upper wall disposed between said truck frames in telescoping relation thereto, and means mounted at spaced apart locations in the side walls of the equalizing girder frame and in the side walls of each truck frame at location intermediate its axles pivotally supporting said equalizing girder frame upon said truck frames for swinging movement of the equalizing girder frame and the truck frames relatively to each other in vertical direction.

4. A truck comprising spaced apart truck frames each consisting of an upper wall and spaced apart, downwardly extending side walls substantially perpendicular to said upper wall, axles mounted in the side walls of each of said truck frames in spaced relation to each other, supporting wheels spaced longitudinally along the truck carried by said axles, an equalizing girder frame consisting of an upper wall and spaced apart, downwardly extending side walls substantially perpendicular to said upper wall disposed between said truck frames in telescoping relation thereto, means mounted at spaced apart locations in the side walls of the equalizing girder frame and in the side walls of each truck frame at location intermediate its axles pivotally supporting said equalizing girder frame upon said truck frames for swinging movement of the equalizing girder frame and the truck frames relatively to each other in vertical direction, a center plate projecting upwardly from the upper wall of said equalizing girder frame, and means pivotally supporting said center plate upon the equalizing girder frame for limited swinging movement of the center plate in a vertical plane extending longitudinally of said truck.

5. A truck comprising an equalizing girder frame consisting of an upper wall and spaced apart, downwardly extending side walls; a plurality of truck frames in adjacent relation to each other including a truck frame having side walls at either end of said equalizing girder frame telescopically associated with the equalizing girder frame, axles supported by each of said truck frames in spaced relation to each other, supporting wheels spaced longitudinally along the truck carried by said axles, means mounted at spaced apart locations of the spaced apart, downwardly extending side walls of said equalizing girder frame and in the side walls of each truck frame at location intermediate its axles pivotally supporting said equalizing girder frame upon said truck frames for swinging movement of the equalizing girder frame and the truck frames relatively to each other in vertical direction, a prime mover, and a flexible driving connection between said prime mover and one of said supported wheels.

6. A truck comprising an equalizing girder frame consisting of an upper wall and spaced apart, downwardly extending side walls; a plurality of truck frames in adjacent relation to each other including a truck frame having side walls at either end of said equalizing girder frame telescopically associated with the equalizing girder frame, axles supported by each of said truck frames in spaced relation to each other, supporting wheels spaced longitudinally along the truck carried by said axles, means mounted at spaced apart locations of the spaced apart, downwardly extending side walls of said equalizing girder frame and in the side walls of each truck frame at location intermediate its axes pivotally supporting said equalizing girder frame upon said truck frames for swinging movement of the equalizing girder frame and the truck frames relatively to each other in vertical direction, a supporting frame carried by and overhanging from one of said truck frames, a prime mover carried by said supporting frame, a flexible driving connection between said prime mover and a supporting wheel upon the truck frame from which said prime mover overhangs, and mechanism for adjusting said supporting frame relative to the truck frame by which carried to cause the tension of said flexible driving connection to be altered.

7. A truck comprising an equalizing girder frame consisting of an upper wall and spaced apart downwardly extending side walls; a plurality of truck frames in adjacent relation to each other including a truck frame having side walls at either end of said equalizing girder frame telescopically associated with the equalizing girder frame, axles supported by each of said truck frames in spaced relation to each other, supporting wheels spaced longitudinally along the truck carried by said axles, means mounted at spaced apart locations of the spaced apart, downwardly extending side walls of said equalizing girder frame and in the side walls of each truck frame at location intermediate its axles pivotally supporting said equalizing girder frame upon said truck frames for swinging movement of the equalizing girder frame and the truck frames relatively to each other in vertical direction, means for driving a supporting wheel upon one of said truck frames, and a flexible driving connection between a driven supporting wheel upon one of said truck frames and a supporting wheel to be driven upon the other of said truck frames.

8. A truck comprising an equalizing girder frame consisting of an upper wall and spaced apart, downwardly extending side walls; a plurality of truck frames in adjacent relation to each other including a truck frame having side walls at either end of said equalizing girder frame telescopically associated with the equalizing girder frame, axles supported by each of said truck frames in spaced relation to each other, supporting wheels spaced longitudinally along the truck carried by said axles, means mounted at spaced apart locations of the spaced apart, downwardly extending side walls of said equalizing girder frame and in the side walls of each truck frame at location intermediate its axles pivotally supporting said equalizing girder frame upon said truck frames for swinging movement of the equalizing girder frame and the truck frames relatively to each other in vertical direction, means for driving a supporting wheel upon one of said truck frames, a flexible driving connection between a driven supporting wheel upon one of said truck frames and a supporting wheel to be driven upon the other of said truck frames, and means for adjustably tensioning said flexible driving connection.

9. A truck comprising spaced apart truck frames each consisting of an upper wall and spaced apart, downwardly extending side walls substantially perpendicular to said upper wall, axles mounted in the side walls of each of said truck frames in spaced relation to each other, supporting wheels spaced longitudinally along the truck carried by said axles, an equalizing girder frame consisting of an upper wall and spaced apart, downwardly extending side walls substantially perpendicular to said upper wall disposed between said truck frames in telescoping relation thereto so that portions of the upper walls and of the spaced apart side walls of said truck frames and said equalizing girder frame, respectively, overlap each other, and means mounted in overlapping portions of the side walls of the equalizing girder frame and each truck frame, respectively, at location intermediate the axles of said truck frames pivotally supporting said equalizing girder frame upon the truck frames for swinging movement of the equalizing girder frame and said truck frames relatively to each other in vertical direction.

10. The combination as specied in claim 9, a center plate, and means pivotally supporting said center plate upon the spaced apart side walls of said equalizing girder frame.

11. A truck comprising spaced apart truck frames each consisting of an upper wall and spaced apart, downwardly extending side walls substantially perpendicular to said upper wall, axles mounted in the side walls of each of said truck frames in spaced relation to each other, supporting wheels spaced longitudinally along the truck carried by said axles, an equalizing girder frame consisting of an upper wall and spaced apart, downwardly extending side walls substantially perpendicular to said upper wall disposed between said truck frames in telescoping relation thereto, means mounted at spaced apart locations in the side walls of the equalizing girder frame and in the side walls of each truck frame at location intermediate its axles pivotally supporting said equalizing girder frame upon said truck frames for swinging movement of the equalizing girder frame and the truck frames relatively to each other in vertical direction, a track clamp selectively for fastening said truck in stationary position upon a riding rail for the truck and for releasing said truck from said riding rail, and means adjustably supporting said track clamp upon said equalizing girder frame at location between said truck frames.

12. A truck comprising spaced apart truck frames each consisting of an upper wall and spaced apart, downwardly extending side walls substantially perpendicular to said upper wall, axles mounted in the side walls of each of said truck frames in spaced relation to each other, supporting wheels spaced longitudinally along the truck carried by said axles, an equalizing girder frame consisting of an upper wall and spaced apart, downwardly extending side walls substantially perpendicular to said upper wall disposed between said truck frames in telescoping relation thereto, and means mounted at spaced apart locations in portions of the side walls of the equalizing girder frame and in portions of the side walls of each truck frame at location intermediate its axles and in telescoping relation to said equalizing girder frame pivotally supporting said equalizing girder frame upon said truck frames for swinging movement of the equalizing girder frame and the truck frames relatively to each other in vertical direction.

13. A truck comprising spaced apart truck frames each consisting of an upper wall and spaced apart, downwardly extending side walls substantially perpendicular to said upper wall, axles mounted in the side walls of each of said truck frames in spaced relation to each other, supporting wheels spaced longitudinally along the truck carried by said axles, an equalizing girder frame consisting of an upper wall and spaced apart, downwardly extending side walls substantially perpendicular to said upper wall disposed between the truck frames with each of the opposite end portions of its upper wall and spaced apart, downwardly extending side walls in telescoping relation to an upper wall and spaced apart, downwardly extending side walls of one of said truck frames, and means mounted at spaced apart locations in portions of the side walls of the equalizing girder frame and in portions of the side walls of each truck frame at location intermediate its axles and telescoped with said side walls of the equalizing girder frame pivotally supporting said equalizing girder frame upon said truck frames for swinging movement of the equalizing girder frame and the truck frames relatively to each other in vertical direction.

14. A truck comprising spaced apart truck frames each consisting of an upper wall and spaced apart, downwardly extending side walls substantially perpendicular to said upper wall, axles mounted in the side walls of each of said truck frames in spaced relation to each other, supporting wheels spaced longitudinally along the truck carried by said axles, an equalizing girder frame consisting of an upper wall and spaced apart, downwardly extending side walls substantially perpendicular to said upper wall disposed between said truck frames in telescoping relation thereto so that portions of the upper walls and of the spaced apart side walls of said truck frames and of said equalizing girder frame, respectively, overlap each other, and means mounted in overlapping portions of the side walls of the equalizing girder frame and each truck frame, respectively, at location intermediate the axles of said truck frames pivotally supporting said equalizing girder frame upon the truck frames for swinging movement of the equalizing girder frame and said truck frames relatively to each other in vertical direction, said means being constituted as pivot pins each having opposite end portions thereof situated in the side walls of said equalizing girder frame and intermediate portions thereof, between said opposite end portions, situated in the side walls of one of said truck frames.

15. A truck comprising spaced apart truck frames each including spaced apart side walls, an equalizing girder frame consisting of an upper wall and spaced apart, downwardly extending side walls between said truck frames and having its side walls telescoped with the truck frames, means pivotally supporting opposite end portions of the spaced apart, downwardly extending side walls of said girder frame upon intermediate, overlapped portions of the side walls of said truck frames, respectively, for relative swinging movement of the equalizing girder frame and the truck frames in vertical direction, and supporting wheels upon each of said truck frames disposed at opposite sides of said pivotally supporting means, said pivotally supporting means being constituted as pivot pins each having opposite end portions thereof situated in the side walls of said equalizing girder frame and intermediate portions thereof situated in the side walls of one of said truck frames.

16. A truck comprising spaced apart truck frames each including spaced apart side walls, an equalizing girder frame consisting of an upper wall and spaced apart, downwardly extending side walls between said truck frames and having its side walls telescoped with the truck frames, means pivotally supporting opposite end portions of the spaced apart, downwardly extending side walls of said girder frame upon intermediate, overlapped portions of the side walls of said truck frames, respectively, for relative swinging movement of the equalizing girder frame and the truck frames in vertical direction, supporting wheels upon each of said truck frames disposed at opposite sides of said pivotally supporting means, means for driving a supporting wheel upon one of said truck frames, a flexible driving connection between a driven supporting wheel upon one of said truck frames and a supporting wheel to be driven upon the other of said truck frames, and means adjustably supported by said equalizing girder frame for varying the tension of said flexible driving connection.

ROBERT J. STODDARD.